(12) United States Patent  (10) Patent No.: US 7,596,113 B1
Kingston et al.  (45) Date of Patent: Sep. 29, 2009

(54) TRANSMISSION SCHEDULING FOR TDMA NETWORKS

(75) Inventors: Samuel C. Kingston, Salt Lake City, UT (US); Thomas R. Giallorenzi, Herriman, UT (US); Johnny M. Harris, Centerville, UT (US)

(73) Assignee: L-3 Communications, Corp., New York, NY (US)

( * ) Notice: Subject to any disclaimer, the term of this patent is extended or adjusted under 35 U.S.C. 154(b) by 548 days.

(21) Appl. No.: 11/540,138

(22) Filed: Sep. 28, 2006

(51) Int. Cl.
*H04B 7/216* (2006.01)
(52) U.S. Cl. .................. 370/320; 370/350; 370/519
(58) Field of Classification Search ................. 370/320
See application file for complete search history.

(56) References Cited

U.S. PATENT DOCUMENTS 6,240,076 B1 * 5/2001 Kanerva et al. ............. 370/330
6,388,997 B1   5/2002 Scott
6,665,289 B1   12/2003 Sebire et al.
2005/0157694 A1   7/2005 Lu et al.

OTHER PUBLICATIONS

Ephremides, Anthony "Scheduling Broadcasts in Multihop Radio Networks" IEEE Transactions on Communications, Apr. 1990, pp. 456-460, vol. 38, No. 4.
Ephremides, Anthony Comments and Corrections to "Scheduling Broadcasts in Multihop Radio Networks" IEEE Transactions on Communications, Apr. 2002, pp. 686, vol. 50, No. 4.
Nadeem, Tamer et al. "Efficient Time-Based Topology-Dependent Scheduling for Radio Packet Networks" IASTED International Conference on Communication and Computer Networks, Nov. 4-6, 2002, pp. 1-8, Cambridge, Massachusettes.

* cited by examiner

*Primary Examiner*—Vincent P Harper
*Assistant Examiner*—Natasha Cosme
(74) *Attorney, Agent, or Firm*—Kirton & McConkie; William T. Ralston

(57) ABSTRACT

A technique for scheduling transmissions for a plurality of transmitters in a TDMA network is described. The technique includes assigning guard time between each pair of successive transmitters, where the guard time is related to the propagation delay between the pair of successive transmitters. Total guard time is minimized by selecting an order of transmission for the plurality of transmitters to minimize the total guard time.

28 Claims, 5 Drawing Sheets

TRANSMISSION SCHEDULING FOR TDMA NETWORKS

FIELD OF THE INVENTION

The present invention relates generally to scheduling transmission for time division multiple access networks.

BACKGROUND

Communications networks make use of time division multiple access (TDMA) to share a communication channel among a number of nodes. TDMA is a time sharing technique where different nodes are assigned different segments of time (known as time slots) during which the nodes are permitted to transmit on the communication channel. Assigning non-overlapping time slots helps to avoid collisions between different transmissions. TDMA can be combined with other access techniques, such as code division multiple access (CDMA) and frequency division multiple access (FDMA).

TDMA systems typically include a guard time between time slots assigned to different nodes to accommodate the effects of propagation delay. Propagation delay results because communications signals move at a finite velocity. For example, radio waves move at the speed of light. Accordingly, receivers located closer to a transmitter will receive the communication signal earlier in time than receivers located further away from the transmitter. Guard time helps to accommodate this differential in reception timing caused by propagation delay.

During the guard time, no node transmits over the shared channel. Accordingly, guard time results in lost channel capacity and reduces the efficiency of the communication network. Therefore, it is beneficial to reduce the amount of guard time.

Various attempts to reduce guard time are known in the art. For example, in TDMA cellular systems, mobile stations can be assigned to transmit in an order corresponding to the round trip propagation delay between the mobile stations and the base station, with remote stations furthest from the base station responding first. This approach reduces guard time in a cellular network, because cellular networks are hub-spoke networks. In a hub-spoke network, all transmissions are either originated or received by hub (e.g., the base station), and no spoke to spoke transmissions (e.g., direct mobile to mobile) are permitted.

Unfortunately, some communications systems are mesh networks, where any node can transmit to any other node. Mesh networks present a more complex situation than hub-spoke networks. One technique is known which minimizes guard time in a mesh network by calculating guard times based on the source (transmitting) and destination (receiving) nodes for each message. Obtaining the source and destination information, however, can be complex and cause inefficiency in the network operation. Furthermore, the approach handles situations where transmissions are point to point (one node to one node) and doesn't handle multi-cast (point to multi-point) or broadcast transmissions. The minimum guard time obtained with this technique can also result in negative guard times (e.g., where a later transmission begins before a previous transmission has completed). Negative guard times can be more difficult to handle in actual implementations.

SUMMARY OF THE INVENTION

One embodiment of the present invention is a method of scheduling transmissions for a plurality of transmitters within a TDMA communications network. The method includes the operation of determining a location of each of the plurality of transmitters. This location can be used to determine distance between pairs of transmitters. An order of transmission for the plurality of transmitters is selected to minimize a sum of distances between each successive pair of transmitters. Guard time is assigned between each successive pair of transmitters, the guard time being equal to or greater than a propagation delay between each successive pair of transmitters.

Additional features and advantages of the invention will be apparent from the detailed description which follows, taken in conjunction with the accompanying drawings, which together illustrate, by way of example, features of the invention.

DETAILED DESCRIPTION

Figure 1:
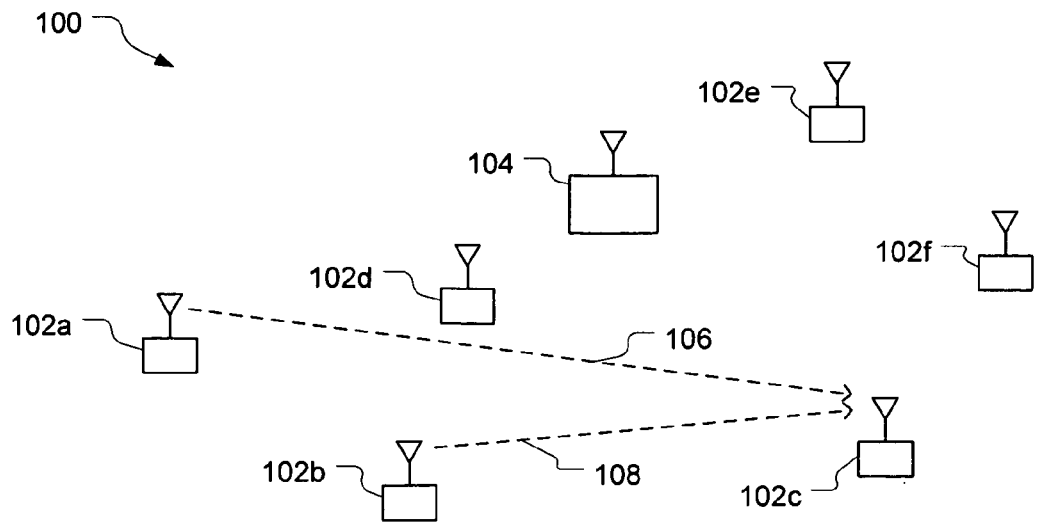
FIG. 1 is a block diagram of a time division multiple access (TDMA) network, in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

FIG. 1 illustrates a time division multiple access (TDMA) system in accordance with an embodiment of the present invention. The system, shown generally at 100, includes a plurality of transmitter units 102, each of which can transmit data during a dynamically assigned time slot. A scheduler 104 is in communication with the plurality of transmitter units, and dynamically assigns time slots to the plurality of transmitter units, as will be described shortly. Time slot assignments determined by the scheduler are communicated to the transmitter units, for example by transmission over a shared radio channel.

Guard time is included to help avoid message transmissions from different transmitter units from overlapping at a receiver. The potential for overlapping transmissions results from the finite time taken for a transmitted signal to propagate through space. For example, consider the situation where a message transmission 106 from node 102a to node 102c is followed by a message transmission 108 from node 102b to node 102c without any intervening time. Because node 102b is closer to node 102c than node 102a, it takes longer for a signal to propagate from node 102a to node 102c than it takes from node 102b to node 102c. Consequently, node 102c will begin receiving the transmission from node 102b before the end of the transmission from node 102a.

Figure 2:
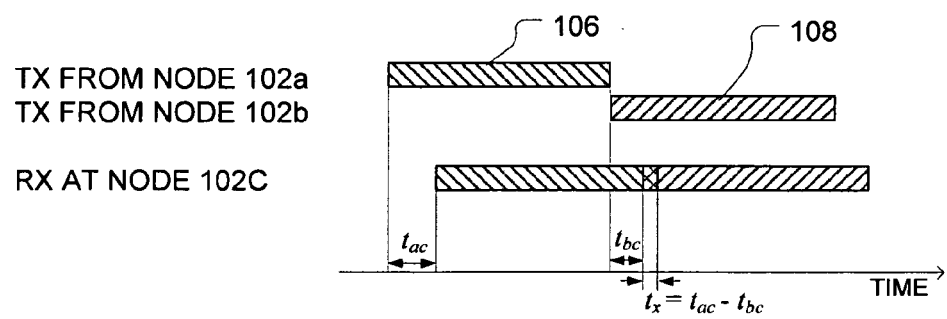
FIG. 2 is a timing diagram of transmissions within the TDMA network of FIG. 1, in accordance with an embodiment of the present invention.

This situation is illustrated in the timing diagram of FIG. 2. The message transmissions from nodes 102a and 102b are shown on the top two lines, and the reception at node 102c is shown in the bottom line. Reception of the transmission 106 from node 102a occurs after a time delay of $t_{ac}$, where $t_{ac}$ is the propagation delay from node 102a to node 102b. Reception of the transmission 108 from node 102b occurs after a time delay of $t_{bc}$, where $t_{bc}$ is the propagation delay from node 102b to node 102c. Because the distance between nodes 102a and 102c is greater than the distance between nodes 102b and 102c, $t_{ac} > t_{bc}$. Hence, the transmissions collide, overlapping by an amount of time equal to $t_x = t_{ac} - t_{bc}$.

The overlap in the example just illustrated can be avoided by including guard time equal to $t_x$. To compute this guard time, however, requires knowledge of the relative positions (and thus delay) of the source (transmit) and destination (receive) nodes. Source and destination information may be unavailable or difficult to obtain in some situations. Furthermore, if more than one node is to receive either message transmission, the calculation of guard time becomes much more complex. For example, one way to avoid collisions when there are multiple intended receiving nodes is to determine the propagation delay between each transmission node and all of the intended receiving nodes. When there is a large numbers of intended receiver nodes, this can be a lot of computation.

As an alternative, the guard time can be set equal to the maximum propagation delay across the entire network. Although computationally simple, this is an inefficient solution, particularly for large networks.

An improved approach for setting guard time will now be described, in accordance with an embodiment of the present invention. The guard time for transmissions between successive nodes can be set equal to the propagation delay between the nodes. For the example above, the guard time can be set equal to $t_{ab}$, where $t_{ab}$ is the propagation delay between node 102a and node 102b. This results in a guard time which is not less than zero (non-negative), helping to avoid negative guard times. The scheduler 104 can thus determine the guard times between pairs of successively scheduled transmitter nodes based on the distance between the nodes, without requiring knowledge of the intended destination of the transmissions. Guard time calculated in this manner is equally applicable to point to point, multicast, and broadcast message transmissions. Because the guard time is set to be equal the propagation delay between node 102a and node 102b, node 102b will begin transmitting immediately after node 102b has received the end of the transmission from node 102a.

Figure 3:
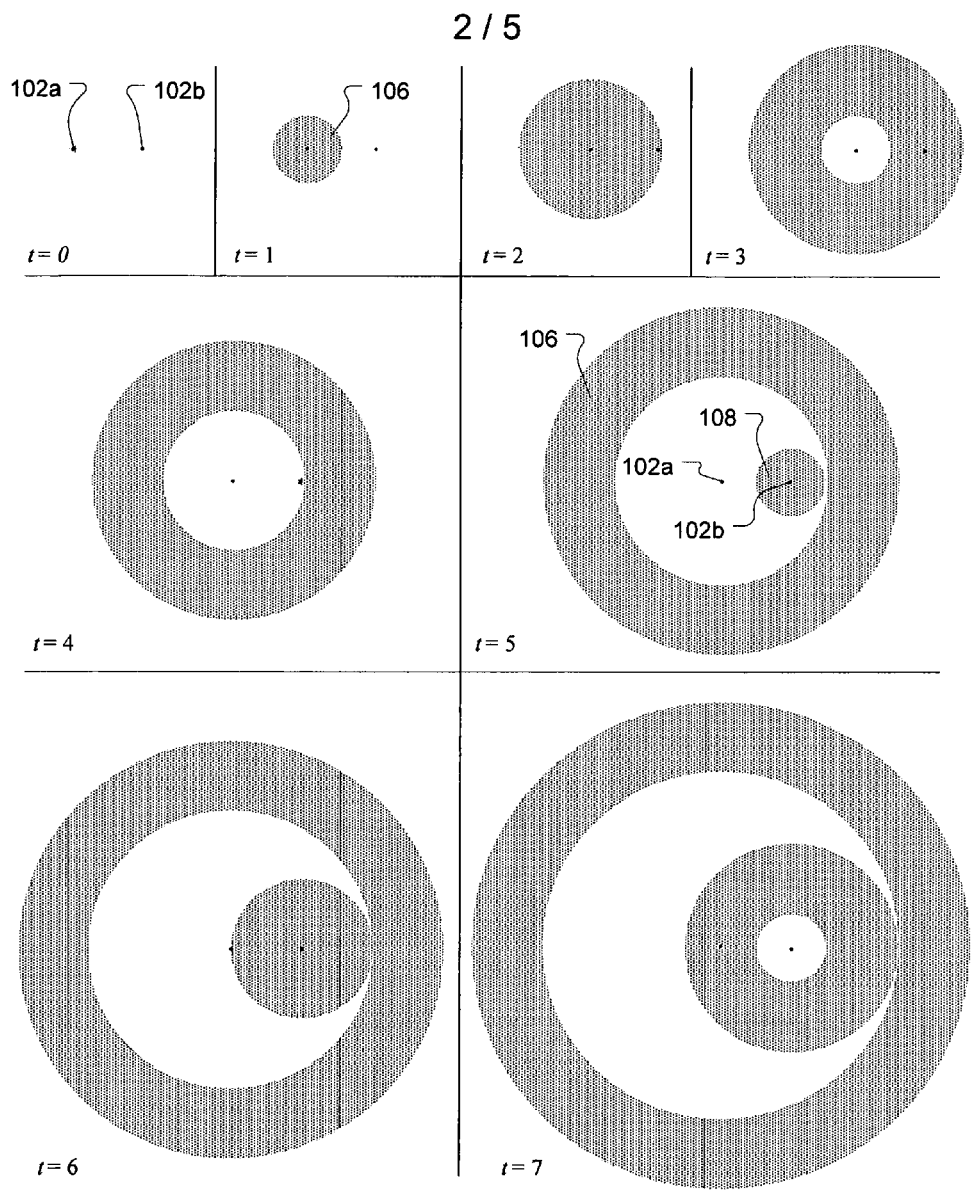
FIG. 3 is a series of time snapshots of a spatial diagram of transmissions within the TDMA network of FIG. 1, in accordance with an embodiment of the present invention.

Setting the guard time in this manner helps to avoid collisions between adjacent time slots. This is illustrated graphically by a series of time snapshots shown in FIG. 3, which shows the propagation of transmission through space for a portion of the network of FIG. 1. Nodes 102a and 102b are represented by points in the diagrams, and transmissions from nodes 102a and 102b are represented by stippled regions of space 106 and 108, respectively. As will be appreciated by one skilled in the art, radio (and similar) transmissions propagate outward from the transmission source in an expanding sphere (a circle, when viewed on a two-dimensional slice as in FIG. 3). A short transmission, such as a TDMA burst takes on the form of a hollow spherical region (a donut shape, when viewed on a two-dimensional slice as in FIG. 3), where the outer edge of the region corresponds to the start of the burst and the inner edge corresponds to the end of the burst, and the inner and outer edges expand at the propagation velocity of the transmitted signal, At time t=0, node 102a starts a transmission burst 106, which begins expanding outward, and has enveloped a circular region two units in diameter by time t=2 and has begun to be received by node 102b. At time t=3, the end of the transmission from node 102a is visible, and the region of space in which the transmission is receivable is a donut shape. At time t=4, node 102b has completed reception of the transmission from node 102a, and begins its transmission burst 108, t=4 being equal to the propagation delay between node 102a and 102b. At time t=5, t=6, and t=6, the donut shaped regions for each transmission continue to expand. It can be seen that the region covered by transmission from node 102b does not overtake (overlap) the region covered by the transmission from node 102a.

Assigning guard time based on the propagation delay between successive nodes is quite robust as will now be shown analytically. Consider three nodes, a, b, and c, located at positions $x_a$, $x_b$, and $x_c$, respectively. Distance between a pair of nodes i,j is given by $d_{ij}$. Propagation delay $t_{ij}$ between nodes i,j is proportional to the distance between the nodes, $d_{ij}$, hence $t_{ij} = kd_{ij}$, where k is the propagation velocity of transmissions. Node a completes transmission at time $t=t_0$ (e.g., time t=2 in FIG. 3) and node b begins transmission at time $t=t_0+t_{ab}$ (e.g., time t=4 in FIG. 3), where $t_{ab}$ is the propagation delay between node a and node b. For an arbitrarily located node c, the time of reception of the end of the transmission from node a is at $t=t_0+t_{ac}$, and the time of reception of the beginning of the transmission from node b is at $t=t_0+t_{ab}+t_{bc}$. There is no overlap between the transmissions from node a and node b as received at node c if:

$$t_0+t_{ac} > t_0+t_{ab}+t_{bc}.$$

This expression can be simplified, and substitutions made, $$t_{ac} > t_{ab}+t_{bc},$$

$$kd_{ac} > kd_{ab}+kd_{bc},$$

to yield $$d_{ac} > d_{ab}+d_{bc}.$$

This is simply a statement of the so-called triangle inequality: the length of any side of a triangle (e.g., $d_{ac}$) is less than or equal to the sum of the lengths of the other two sides (e.g., $d_{ab}+d_{bc}$). Equality occurs when the triangle degenerates to a line (e.g., nodes a, b, and c are in a line). As will be discussed further below, it is sometimes desirable to include additional guard time.

Figure 4:
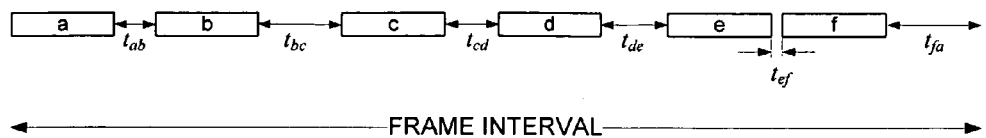
FIG. 4 is a time chart of an exemplary frame structure in accordance with an embodiment of the present invention.

Improvement obtained by sequencing transmissions to minimize guard time will now be illustrated graphically. As a baseline, FIG. 4 illustrates an exemplary frame structure showing sequentially assigned time slots for the transmitter units 102 in the TDMA network 100 of FIG. 1. Time is shown on the horizontal axis. Transmissions from the nodes 102 are labeled with letters corresponding to the node, e.g. node 102a is labeled 'a'. For simplicity, it has been assumed that all message transmissions are the same length, although this is not required, and one skilled in the art will readily understand how to apply the presently disclosed concepts to a network having variable length message transmissions.

The time slot assignments have been made sequentially so that the nodes transmit in order. The total guard time is the sum of all guard times, e.g. $t_{ab}+t_{bc}+t_{cd}+t_{de}+t_{ef}+t_{fa}$. As noted above, guard time is lost time, since no node in the network is transmitting during the guard time. The resulting frame has a significant amount of guard time, resulting in a relatively low efficiency. This efficiency lost due to guard time becomes more significant when the propagation delay becomes significant relative to the length of message transmissions. For example, when the average propagation delay is about the same as the average message transmission length, about half of the frame interval is used for guard time.

Figure 5:
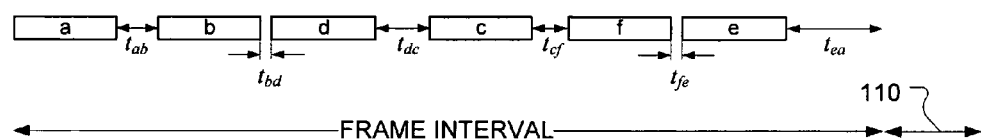
FIG. 5 is a time chart of an exemplary frame structure with reduced guard time, in accordance with an embodiment of the present invention.

Improved efficiency can be obtained by the scheduler dynamically assigning the time slots to minimize the total guard time. FIG. 5 illustrates an exemplary frame structure, where the time slot assignments are arranged to minimize the total guard time. In general, the guard time can be reduced by finding the order of stations which results in lower total distance summed over each pair of successive nodes. Hence, the scheduler can assign the time slots to minimize the total guard time, using various approaches as will be discussed.

Reduced guard time allows the efficiency of the TDMA network to be improved in several different ways. One option is to reduce the frame rate. For example, as shown in FIG. 5, the total frame length can be reduced by the amount shown at 110 relative to the example of FIG. 4. This can allow higher frame rates, resulting in lower latency and higher through put (since transmitter units can transmit more frequently). As will be appreciated, the frame rate will depend on the total guard time, and hence the frame rate may be variable.

An alternate option is to hold the frame interval constant, and increase the number of transmitter units than can be accommodated within the frame. This can allow a larger number of transmitter units within the network to be accommodated. Yet another option is to hold the frame interval constant, and increase the size of the transmission slots. This can allow higher throughput for the network. Various other combinations and alterations of these examples will occur to one skilled in the art. In general, by reducing the amount of time used by guard time, improved network efficiency can be obtained.

Finding an ordering of nodes which minimizes the total sum of distances between successive pairs of nodes is equivalent to the well known traveling salesman problem (TSP). In the TSP, the objective is to find the shortest route, starting and ending at one city, which visits all of a specified number of cities exactly once. Since the problem is symmetric, in the sense that the distance from point a to point b is the same as the distance from point b to point a, this is sometimes called the symmetric TSP (to distinguish from the more complex, general problem known as the asymmetric TSP seeking to minimize cost, where the cost of traveling from a to b is different from the cost of traveling from b to a).

In general, for an n node network, there are n! possible solutions for the sequence of transmissions. However, since the problem is symmetric ($t_{ab}=t_{ba}$), only n!/2 solutions are distinct, since the order of travel doesn't matter. Furthermore, since we can select any node as the first node, this can reduce the number of distinct solutions to (n−1)!/2.

Many different optimization problems are equivalent to the TSP, and hence there is a broad literature describing solutions to the TSP. For example, one possible solution is to exhaustively test each of the possible orderings, searching for the minimum, although this approach becomes very computationally expensive for large network sizes. Various higher efficiency approaches than brute force searching are known, including for example "branch and bound" and "cutting plane techniques."

Because of the computational complexity of solving the TSP, many techniques which yield approximate solutions have also been developed and described in the literature. Approximate solutions can find a minimum solution, although it is not guaranteed that the minimum solution is the optimal solution (absolute least possible distance traveled). As used herein, the terms "minimum," "minimize," and the like are intended to include solutions obtained by an approximate solution to the TSP. Accordingly, approximate solutions can be used by the scheduler to reduce the total guard time.

For example, one approximate solution (known as the "nearest neighbor solution") begins by selecting an arbitrary node as the starting node. Of the remaining nodes, the nearest neighbor to the starting node is selected as the next node to transmit. Then, the next nearest neighbor is selected from the remaining unscheduled nodes as the next node to transmit. The algorithm continues similarly, picking nearest neighbors until all nodes have been selected. It is known that the nearest neighbor solution can fail to find a small solution in some situations, and in certain situations can even result in a solution that is the maximum possible travel distance. However, even in such a situation, the resulting guard times are still less than the propagation time across the entire network. Hence, even approximate solutions which occasionally fail to achieve the absolute minimum are robust, in that the total guard time will not be more than that achieved by an approach which simply sets every guard time equal to the propagation delay across the entire network.

Another approximate solution may be based on knowledge of the network. For example, consider a mobile network having a plurality of transmitter units which are airborne. If it is known, a priori, that the airborne units are in groups (e.g., fighter wings), a good solution can be obtained by allocating the units of a group into a series of adjacent slots, since members of a group are likely to be close together. Hence, an approximate solution can avoid examining distance (or propagation delay) between every possible successive pair of transmitters and instead look at distances (or propagation delay) between groups of transmitter units. Ordering of the groups is selected to minimize the total sum of distances (propagation delays), and ordering within a group can be sequential.

Hence, one function of the scheduler 104 is to dynamically assign time slots to the plurality of transmitter units 102. Guard time is assigned between successive time slots based on the propagation delay between the transmitter units scheduled for transmission in the successive time slots. Time slots assignments are assigned to minimize the total guard time. The time slot assignments are communicated from the scheduler to the plurality of transmitter units, as will be described further below.

Figure 6:
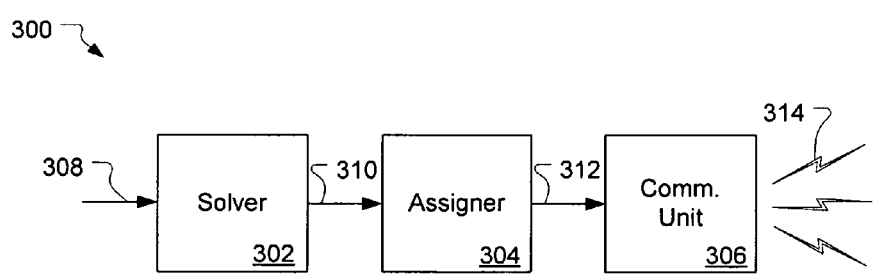
FIG. 6 is a block diagram of a time slot controller for a TDMA network, in accordance with an embodiment of the present invention.

There are various options for implementing the scheduler 104. For example, if there is a network controller node, the scheduler can be included within the network controller node. FIG. 6 illustrates a block diagram of a time slot controller for a TDMA network in accordance with an embodiment of the present invention. The time slot controller 300, includes a solver 302, a time slot assigner 304, and a communications unit 306. The solver accepts a plurality of locations 308 of the transmitter units and finds an ordering 310 that produces a minimum of the total sum of distance between the locations of each successive pair of transmitter units. The locations of the transmitter units can be made known to the solver by various ways, as discussed further below. Fining a minimum total distance is equivalent to solving the TSP, as discussed above, and thus techniques known for solving the TSP can be implemented by the solver. The solver can be implemented in hardware, for example using a field programmable gate array (FPGA) or application specific integrated circuit (ASIC). As another example, the solver can be implemented in software, for example using a digital signal processor (DSP) or microprocessor.

The time slot assigner 304 accepts the transmit ordering 310 from the solver and determines a plurality of transmission times 312. For example, guard time is allocated between each successive pair of transmitter units as described above. As a more particular example, consider transmissions from node a followed by node b. If node a is scheduled to begin transmission at time $t_0$, its transmission will complete at time $t_0+t_a$, where $t_a$ is the length of node a's transmission. Guard time $t_{ab}$ is allocated after the end of node a's transmission. Hence, node b is scheduled to begin transmission at time $t_0+t_a+t_{ab}$. Of course, this computation can be simplified somewhat if all of the transmissions are the same length. The time slot assigner can be implemented using similar electronics as the solver 302.

The communications unit 306 accepts the plurality of transmission times 312 from the time slot assigner 304 and communicates 314 these to the transmitter units. For example, the transmission times can be transmitted to the transmitter units by the communications unit using a specific time slot as discussed further below.

Returning to the discussion of FIG. 1, an alternate implementation of the scheduler 104 is for the scheduler to be included in one of the transmitter units 102. As yet another alternative, a subset of the transmitter units (or even all of the transmitter units) can be capable of operating as the scheduler and one of the transmitter units active as the scheduler at any given time. For example, transmitter units can take turns operating as the scheduler on a regular or pseudo-random schedule. Shifting responsibility for scheduling to different nodes in the network provides the TDMA system 100 additional robustness against failure of a particular transmitter node.

Various options for communicating the time slot assignments to the plurality of transmitter units are possible. For example, the scheduler can be assigned a fixed time slot during which the scheduler transmits time slots assignments. This time slot can be designated the control slot. For example, the control slot may be placed first in the frame to define the beginning of the frame, and contain slot assignments for the current (or a later) frame. Other options will occur to one skilled in the art.

Figure 7:
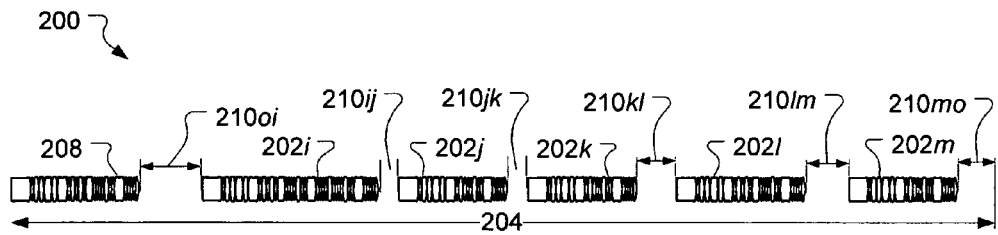
FIG. 7 is a conceptual illustration of a frame observed over a radio channel, in accordance with an embodiment of the present invention.

FIG. 7 illustrates a conceptual illustration of a frame 200 as observed over a radio communication channel, in accordance with an embodiment of the present invention. The frame includes a plurality of time slots 202 within a frame interval 204. Each time slot 202*i*, 202*j*, . . . 202*m* has information digitally modulated onto a radio carrier by a transmitter unit i, j, . . . m assigned to the time slot. Various formats for digitally modulating information onto a radio carrier are known in the art, including for example, phase modulation, frequency modulation, and amplitude modulation. Time slots can be of fixed or variable length. One time slot is a control slot 208, having information digitally modulated onto a carrier defining the assignments of transmitter units to time slots. Various ways of encoding time slot assignment information in the control slot will be readily apparent to one skilled in the art. For example, encoding time slot assignments may include transmitting a list of pairs of node addresses and time assignments. Various formats for encoding time assignments will also occur to one skilled in the art, including for example, providing time assignments as a time offset from the beginning of the frame. Between each pair of successive time slots is a guard time 210. The guard time between time slots corresponds to the propagation delay between the transmitters assigned to the time slot pair. The ordering of assignment is determined by the scheduler to minimize the total guard time, for example, as described above.

Although guard time has been shown as appearing at the end of time slots throughout the above description, this is not essential. Guard time can be allocated at the beginning of each time slot as well as will be readily apparent to one skilled in the art.

Time slots can be assigned to every transmitter unit in the entire network each frame interval, but this is not essential. Efficiency can be improved by allocating time slots to only a subset of transmitter units which have information to be transmitted during a given frame interval. Various ways of providing such resource scheduling are known in the art, and will not be discussed further.

Returning again to the discussion of FIG. 1, the plurality of transmitter units 102 can include transmitter units which are mobile, changing their location during operation of the TDMA network 100. For example the network can include transmitter units associated with pedestrians, foot soldiers, ground vehicles, aircraft, ships, spacecraft, and the like. Accordingly, as the positions of the transmitter units change, guard times can be updated and a new time slot assignment ordering may result in less total guard time.

Accordingly, the transmitter units 102 can communicate updated position information to the scheduler. For example, position information may be communicated periodically through the TDMA system 100 or via alternate communications means. Alternately, position information may be communicated when a transmitter unit determines it has moved by more than a threshold distance. Upon receipt of updated position information, the scheduler can reorder the sequence of time slot assignments for the plurality of transmitter units to obtain a new minimum total guard time.

With respect to the guard time, there are several different options for how the guard time between two successive transmissions can be assigned. As discussed above, the guard time between successive transmitter units can be set equal to the propagation delay between the successive transmitter units. To accommodate for time used to switch from receive to transmit mode (and/or vice versa) for some implementations, it may be desirable include additional guard time. Additional guard time may also be included to allow for errors in time synchronization. In addition, there may be errors in the position information used to determine the distance between the successive transmitter units, for which additional guard time can be included to help compensate. Accordingly, the guard time can be set equal to the propagation delay between the successive pair of transmitters plus a predetermined constant. The constant can be an amount of time selected to account for as many of these types of error as desired, or can be set to zero. As another alternative, the guard time can be set proportional to the propagation delay between the successive pair of transmitters. The later example may prove useful where there is uncertainty in the exact value of the propagation constant (e.g., non-free space communications links) or errors that scale with distance.

Various ways of determining the propagation delay between transmitter units 102 are available. Most directly, the propagation delay between two transmitter units can be determined from the distances between the transmitter units. For example, for radio signals, the propagation delay $t_p=cd$, where c is the velocity of light and d is the distance between the transmitter units. The distance can be determined based on known locations of the transmitter units, for example, as obtained from the Global Positioning System (GPS) or similar systems. Alternately, known locations can be obtained manually, or can be obtained by self-ranging or triangulation within the TDMA system 100. As yet another example, propagation delay between transmitter units may be obtained directly, for example, though round trip ranging, without requiring knowledge of the locations of the transmitter units.

Figure 8:
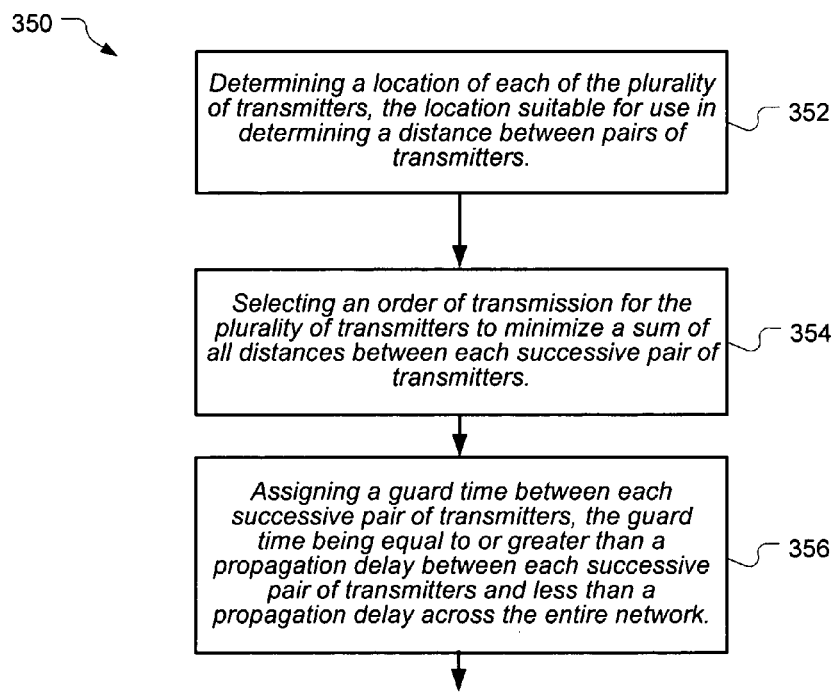
FIG. 8 is a flowchart of a method of scheduling transmissions for a plurality of transmitters within a TDMA network.

Accordingly, a method of scheduling transmissions for a plurality of transmitters within a TDMA communication network is described in flowchart form in FIG. 8. The method 350 includes the step of determining 352 a location of each of the plurality of transmitters. The location is suitable for use in determining a distance between pairs of transmitters. For example, the locations can be known a priori or determined during operation of the communication network. Locations can be provided in the form of coordinates (e.g. from GPS or other geolocation systems) in an absolute or a relative coordinate system. Various other ways for determining the locations of the transmitters will be apparent to one of skill in the art from this disclosure.

Another step of the method is selecting 354 an order of transmission for the plurality of transmitters to minimize a sum of all distances between each successive pair of transmitters. For example, this step can be implemented as a solution to the TSP, as described above.

The method can also include assigning a guard time between each successive pair of transmitters. The guard time can be set equal to or greater than a propagation delay between each successive pair of transmitters and less than a propagation delay across the entire network For example, the propagation delay can be determined based on the distance between the transmitters, as discussed above.

Figure 9:
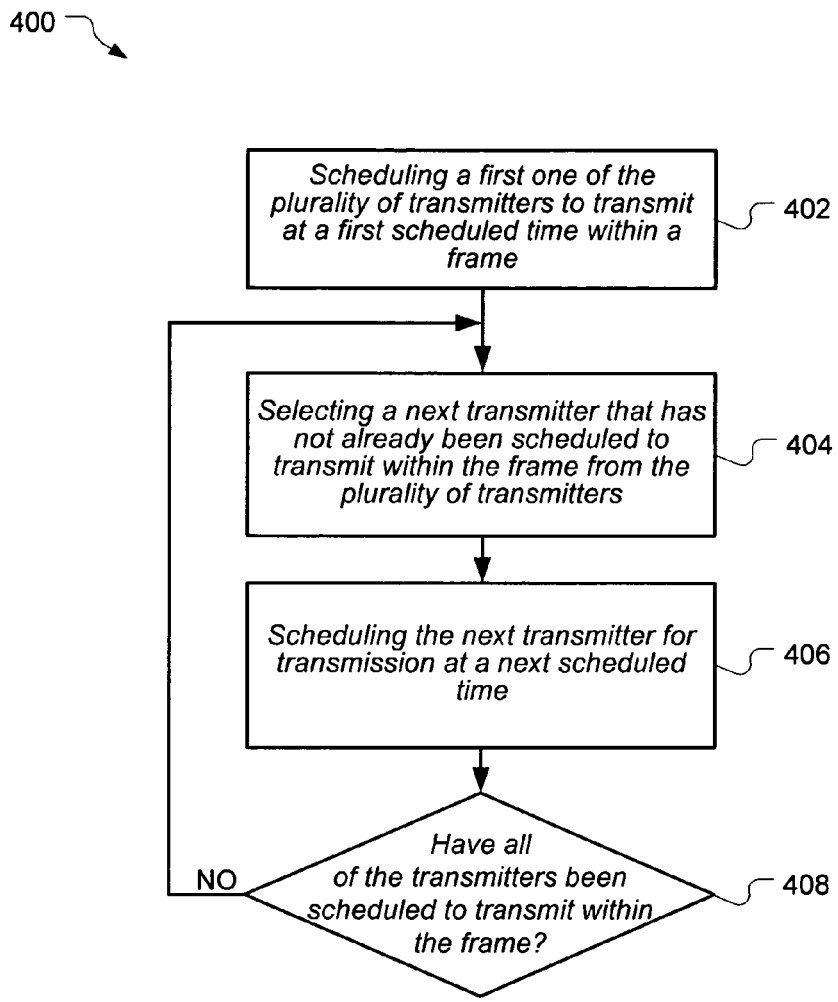
FIG. 9 is a flowchart of a method of managing transmission sequencing and guard times in a TDMA network, in accordance with an embodiment of the present invention.

In accordance with another embodiment of the present invention, a method of managing transmission sequencing and guard times for a plurality of transmitters within a TDMA network is described in flowchart form in FIG. 9B. The method 400 includes a first step of scheduling 402 a first one of the plurality of transmitters to transmit at a first scheduled time within a frame. For example, a first transmitter can be selected arbitrarily. As another example, a first transmitter can be selected which is a controller for the network. In the next two steps a next transmitter than has not already been scheduled to transmit is selected 404 and the transmitter is scheduled 406 to transmit at a next scheduled time. The next scheduled time includes a guard time equal to or greater than the propagation delay between the next transmitter and the immediately preceding transmitter. Steps 404 and 406 are repeated 408 until all of the transmitters have been scheduled to transmit within the frame. The transmitters can be selected in an order which minimizes a total guard time within the frame, as discussed above.

In sum, it will now be appreciated by one skilled in the art that the method and systems described herein can provide an improvement in guard time in a TDMA network. An approach for assigning guard time has been shown which is based entirely on the positions of transmitting nodes, and does not require knowledge of the position (or even identity) of intended recipients of transmissions. Accordingly, broadcast and multi-cast transmissions can be accommodated in a mesh network. Transmissions can be ordered to minimize guard time based on solutions to the traveling salesman problem. Approximate solutions can provide reduced guard times relative to cross-network propagation delay. Furthermore, the guard time can be independent of the overall size of the network, depending instead on the distance between pairs of nodes.

Although the techniques herein have been described primarily in the context of a radio communication network, application of the techniques to other types of communications systems using TDMA will be readily apparent to one skilled in the art having possession of this disclosure, and considered to be within the scope of the present invention.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A method of scheduling transmissions for a plurality of transmitters within a time division multiple access communications network, comprising the steps of:
   determining a location of each of the plurality of transmitters, the location suitable for use in determining a distance between pairs of transmitters;
   selecting an order of transmission for the plurality of transmitters to minimize a sum of all distances between each successive pair of transmitters; and
   assigning a guard time between each successive pair of transmitters, the guard time being equal to or greater than a propagation delay between each successive pair of transmitters and less than a propagation delay across the entire network.

2. The method of claim 1, wherein the guard time is non-negative.

3. The method of claim 1, wherein the step of determining a location of each of the plurality of transmitters comprises communicating the location of each transmitter to a controller.

4. The method of claim 1, wherein the step of selecting an order of transmission comprises the step of finding a nearest neighbor for each transmitter.

5. The method of claim 4, wherein the step of selecting an order of transmission comprises the step of finding a next nearest neighbor for each transmitter.

6. The method of claim 1, wherein the step of assigning a guard time between each successive pair of transmitters comprises the step of setting the guard time equal to the propagation delay between the locations of each successive pair of transmitters.

7. The method of claim 1, wherein the step of assigning a guard time between each successive pair of transmitters comprises the step of setting the guard time equal to a sum of the propagation delay between the locations of each successive pair of transmitters and a predetermined constant.

8. The method of claim 1, wherein the step of assigning a guard time between each successive pair of transmitters comprises the step of setting the guard time proportional to the propagation delay between the locations of each successive pair of transmitters.

9. The method of claim 1, further comprising the step of scheduling a transmission time for each transmitter based on the guard times.

10. The method of claim 9, wherein the step of scheduling a transmission time comprises the step of scheduling each successive pair of transmitters to transmit at times separated by an interval equal to the length of a transmission of the first transmitter in the successive pair plus the guard time between the successive pair of transmitters.

11. The method of claim 9, wherein the step of scheduling a transmission time comprises the step of communicating scheduled transmit times from a controller to the plurality of transmitters.

12. The method of claim 1, further comprising the step of updating the location of at least one of the plurality of transmitters to obtain at least one updated location.

13. The method of claim 12, further comprising reordering the order of transmission for the plurality of transmitters based on the at least one updated location to minimize a sum of distances between the locations of each successive pair of transmitters.

14. The method of claim 1, further comprising scheduling each of the plurality of transmitters for transmission once per frame interval.

15. The method of claim 1, further comprising scheduling only a subset of the plurality of transmitters for transmission within a frame interval, the subset consisting of those transmitters which have data to transmit.

16. The method of claim 1, further comprising scheduling a transmission for an additional transmitter within the time division multiple access communication network sequentially in time after one of the plurality of transmitters.

17. A method of managing transmission sequencing and guard times for a plurality of transmitters within a time division multiple access communication network, comprising the steps of:
   scheduling a first one of the plurality of transmitters to transmit at a first scheduled time within a frame; and
   repeatedly:
      selecting a next transmitter that has not already been scheduled to transmit within the frame from the plurality of transmitters, and
      scheduling the next transmitter for transmission at a next scheduled time,
      until each of the plurality of transmitters has been scheduled in the frame,
      wherein the next scheduled time includes a guard time equal to or greater than the propagation delay between the next transmitter and the immediately preceding transmitter.

18. The method of claim 17, wherein the step of scheduling the next scheduled time further comprises the step of ordering the scheduled times to minimize a total guard time equal to the sum of guard times between each successive pair of transmitters.

19. The method of claim 17, wherein the guard time is substantially less than the propagation delay across the entire network.

20. The method of claim 17, wherein the guard time between successive pairs of transmitters is equal to the propagation delay between the successive pair of transmitters plus a predetermined constant.

21. A time slot controller for a time division multiple access communication network having a plurality of transmitter units, comprising:
   a solver configured to accept a plurality of locations of the transmitter units and find a transmit ordering of the plurality of transmitter units that produces a minimum of the total distance, wherein the total distance equals the sum of distances between the locations of each pair of successive transmitter units;
   a time slot assigner coupled to the solver to accept the transmit ordering and configured to schedule a plurality of transmission times, wherein the plurality of transmit times includes guard times between each successive pair of transmitter units equal to a propagation delay between the locations of each pair of successive transmitter units; and
   a communications unit coupled to the time slot assigner to accept the plurality of transmission times and configured to communicate the plurality of transmission times to the plurality of transmitter units.

22. A time division multiple access system comprising:
   a plurality of transmitter units, each transmitter unit configured to transmit data during a dynamically assigned time slot; and
   a scheduler, in communication with the plurality of transmitter units, the scheduler configured to:
      dynamically assign time slots to the plurality of transmitter units, wherein time slot assignments are assigned to minimize total guard time, where the guard time between successive time slots is related to the propagation delay between the transmitter units scheduled for transmission in the successive time slots, and
      communicate time slot assignments to the plurality of transmitter units.

23. The system of claim 22, wherein the scheduler is located within one of the plurality of transmitter units.

24. The system of claim 22, wherein each transmitter unit is capable of operating as the scheduler and one transmitter unit is active as the scheduler at any given time.

25. The system of claim 24, wherein each transmitter unit takes turns operating as the scheduler.

26. The system of claim 24, wherein each transmitter unit communicates updated position information to the scheduler.

27. The system of claim 22, further comprising a controller, wherein the controller includes the scheduler.

28. The system of claim 27, wherein the scheduler is assigned a time slot during which the scheduler transmits time slot assignments to the plurality of transmitter units.

* * * * *